United States Patent
Dhaens et al.

(10) Patent No.: US 12,344,065 B2
(45) Date of Patent: *Jul. 1, 2025

(54) SINGLE AXLE ROLL CONTROL SYSTEM WITH MULTIPLE PRESSURIZING DEVICES ARRANGED IN SERIES

(71) Applicant: DRiV Automotive Inc., Northville, MI (US)

(72) Inventors: Miguel Dhaens, Lommel (BE); Monzer Al Sakka, Sint-Truiden (BE)

(73) Assignee: Advanced Suspension Technology LLC, Northville, MI (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/197,130

(22) Filed: May 15, 2023

(65) Prior Publication Data

US 2024/0383302 A1 Nov. 21, 2024

(51) Int. Cl.
*B60G 17/08* (2006.01)
*B60G 9/02* (2006.01)
(Continued)

(52) U.S. Cl.
CPC ............... *B60G 17/08* (2013.01); *B60G 9/02* (2013.01); *B60G 13/08* (2013.01); *B60G 21/073* (2013.01);
(Continued)

(58) Field of Classification Search
CPC .......... B60G 17/08; B60G 9/02; B60G 13/08; B60G 2202/24; B60G 2204/62;
(Continued)

(56) References Cited

U.S. PATENT DOCUMENTS 2,503,016 A 4/1950 Weeks et al.
3,328,019 A 6/1967 Wilson
(Continued)

FOREIGN PATENT DOCUMENTS

CN 105857007 A 8/2016
CN 109927692 A 6/2019
(Continued)

OTHER PUBLICATIONS

Seong, KR-20160093421-A, Machine Translation of Specification (Year: 2015).*

(Continued)

*Primary Examiner* — Drew J Brown
*Assistant Examiner* — Matthew Joseph Ganci
(74) *Attorney, Agent, or Firm* — Harness, Dickey & Pierce, P.L.C.

(57) ABSTRACT

A single axle suspension system including right and left dampers, first and second hydraulic circuits, a first pressurizing mechanism connected in fluid communication with the first and second hydraulic circuits, and a second pressurizing mechanism connected in series with the first pressurizing mechanism. The first pressurizing mechanism provides roll control by generating a pressure differential between the first and second hydraulic circuits. This causes an increase in the fluid pressure inside either the first working chamber of the right damper and the second working chamber of the left damper or inside the first working chamber of the left damper and the second working chambers of the right damper to provide roll stiffness that counters vehicle roll during cornering. The second pressurizing mechanism adjusts static pressure within the first and second hydraulic circuits by adding and removing hydraulic fluid to and from the first and second hydraulic circuits.

20 Claims, 5 Drawing Sheets

(51) Int. Cl.
*B60G 13/08* (2006.01)
*B60G 17/015* (2006.01)
*B60G 17/016* (2006.01)
*B60G 21/073* (2006.01)
*F15B 21/00* (2006.01)

(52) U.S. Cl.
CPC ........ *F15B 21/005* (2013.01); *B60G 17/0152* (2013.01); *B60G 17/0162* (2013.01); *B60G 2202/24* (2013.01); *B60G 2202/416* (2013.01); *B60G 2204/62* (2013.01); *B60G 2204/82* (2013.01); *B60G 2204/8304* (2013.01); *B60G 2206/41* (2013.01); *B60G 2500/104* (2013.01); *B60G 2500/114* (2013.01); *B60G 2600/182* (2013.01); *B60G 2800/012* (2013.01); *B60G 2800/162* (2013.01); *B60G 2800/9122* (2013.01); *B60G 2800/916* (2013.01)

(58) Field of Classification Search
CPC ........ B60G 2204/8304; B60G 2206/41; B60G 2600/182; B60G 2800/9122; B60G 2800/916; B60G 21/073; B60G 21/02; B60G 21/06; B60G 2202/416; B60G 2500/114; F15B 21/005
See application file for complete search history.

(56) References Cited

U.S. PATENT DOCUMENTS

| | | |
|---|---|---|
| 3,475,059 A | 10/1969 | Christof |
| 3,752,497 A | 8/1973 | Enke et al. |
| 3,871,635 A | 3/1975 | Unruh et al. |
| 3,921,746 A | 11/1975 | Lewus |
| 4,295,538 A | 10/1981 | Lewus |
| 4,741,206 A | 5/1988 | Ishiguro et al. |
| 5,562,305 A | 10/1996 | Heyring et al. |
| 5,573,388 A | 11/1996 | Tar et al. |
| 5,682,980 A | 11/1997 | Reybrouck |
| 5,899,472 A | 5/1999 | Burke et al. |
| 6,010,139 A | 1/2000 | Heyring et al. |
| 6,196,555 B1 | 3/2001 | Gaibler |
| 6,669,208 B1 | 12/2003 | Monk et al. |
| 7,240,906 B2 | 7/2007 | Klees |
| 7,384,054 B2 | 6/2008 | Heyring et al. |
| 7,686,309 B2 | 3/2010 | Munday et al. |
| 7,751,959 B2 | 7/2010 | Boon et al. |
| 7,909,341 B2 | 3/2011 | Van Der Knaap |
| 7,959,164 B2 | 6/2011 | Keane et al. |
| 8,123,235 B2 | 2/2012 | Monk et al. |
| 8,544,863 B2 | 10/2013 | Revill et al. |
| 8,967,629 B2 | 3/2015 | Oshita et al. |
| 9,352,633 B2 | 5/2016 | Kim |
| 10,358,010 B2 | 7/2019 | Boon et al. |
| 10,434,835 B2 | 10/2019 | Six et al. |
| 10,589,591 B2 | 3/2020 | Sakka et al. |
| 10,850,586 B2 | 12/2020 | Sorniotti et al. |
| 11,084,349 B2 | 8/2021 | Dhaens et al. |
| 11,117,435 B2 | 9/2021 | Liebold et al. |
| 11,192,424 B2 | 12/2021 | Tabata et al. |
| 11,220,152 B2 | 1/2022 | Witte |
| 11,338,637 B2 | 5/2022 | Dhaens et al. |
| 11,351,829 B2 | 6/2022 | Stahl |
| 11,351,830 B2 | 6/2022 | Sorniotti et al. |
| 11,376,917 B2 | 7/2022 | Simon et al. |
| 11,541,797 B2 | 1/2023 | Dhaens |
| 11,577,572 B2 | 2/2023 | Dhaens |
| 11,679,820 B2 | 6/2023 | Streit |
| 11,685,220 B2 | 6/2023 | Calchand et al. |
| 11,794,542 B2 | 10/2023 | Boulay et al. |
| 11,865,887 B2 | 1/2024 | Boon et al. |
| 11,970,034 B2 | 4/2024 | Kalnitski et al. |
| 2003/0015463 A1* | 1/2003 | Viken ................ F01M 11/0458 210/138 |
| 2004/0113377 A1 | 6/2004 | Klees |
| 2006/0287791 A1 | 12/2006 | Boon et al. |
| 2007/0170680 A1 | 7/2007 | Knaap |
| 2012/0098216 A1 | 4/2012 | Ryan et al. |
| 2012/0305347 A1* | 12/2012 | Mori ................ B60G 17/08 188/266.2 |
| 2013/0074487 A1 | 3/2013 | Herold et al. |
| 2014/0225336 A1 | 8/2014 | Ryan et al. |
| 2014/0232082 A1 | 8/2014 | Oshita et al. |
| 2018/0162188 A1 | 6/2018 | Chikamatsu et al. |
| 2018/0229574 A1 | 8/2018 | Okimura |
| 2018/0345747 A1 | 12/2018 | Boon et al. |
| 2019/0225044 A1 | 7/2019 | Witte |
| 2019/0263213 A1 | 8/2019 | Sakka et al. |
| 2019/0305558 A1 | 10/2019 | Abaitancei et al. |
| 2020/0062069 A1 | 2/2020 | Sorniotti et al. |
| 2020/0180386 A1 | 6/2020 | Tabata et al. |
| 2020/0238780 A1 | 7/2020 | Dhaens et al. |
| 2020/0238876 A1 | 7/2020 | Dhaens |
| 2020/0247207 A1 | 8/2020 | Dhaens et al. |
| 2021/0023902 A1 | 1/2021 | Sorniotti et al. |
| 2021/0061046 A1 | 3/2021 | Simon et al. |
| 2021/0155068 A1 | 5/2021 | Stabel |
| 2021/0362557 A1 | 11/2021 | Stahl |
| 2022/0001713 A1 | 1/2022 | Huth et al. |
| 2022/0144035 A1 | 5/2022 | Al Sakka et al. |
| 2022/0281278 A1 | 9/2022 | Boulay et al. |
| 2022/0281280 A1 | 9/2022 | Praet et al. |
| 2022/0380004 A1 | 12/2022 | Walker et al. |
| 2022/0410647 A1 | 12/2022 | Dhaens |
| 2023/0110337 A1 | 4/2023 | Calchand et al. |
| 2023/0111977 A1 | 4/2023 | Boon et al. |
| 2023/0112405 A1* | 4/2023 | Calchand ............. B60G 11/265 280/5.515 |
| 2023/0113819 A1 | 4/2023 | Vandersmissen et al. |
| 2023/0114717 A1 | 4/2023 | Boon et al. |
| 2023/0115594 A1 | 4/2023 | Calchand et al. |
| 2023/0278387 A1 | 9/2023 | Birch et al. |
| 2023/0302865 A1 | 9/2023 | Tong et al. |
| 2023/0302866 A1 | 9/2023 | Tong et al. |
| 2023/0302867 A1 | 9/2023 | Tong et al. |

FOREIGN PATENT DOCUMENTS

| | | | |
|---|---|---|---|
| CN | 111140567 A * | 5/2020 | ............. F15B 19/00 |
| DE | 3936987 A1 | 5/1991 | |
| DE | 19853876 A1 | 5/2000 | |
| DE | 102008027134 A1 | 12/2009 | |
| DE | 102009010850 A1 | 9/2010 | |
| DE | 102010021029 A1 | 11/2011 | |
| DE | 102010045031 A1 | 3/2012 | |
| DE | 102010054908 A1 | 6/2012 | |
| DE | 102015214429 A1 | 2/2017 | |
| DE | 102017214264 A1 | 2/2019 | |
| EP | 4032732 A1 | 7/2022 | |
| FR | 2907377 B1 | 1/2012 | |
| GB | 2238990 A | 6/1991 | |
| GB | 2315248 A | 1/1998 | |
| GB | 2597454 A | 2/2022 | |
| GB | 2597455 A | 2/2022 | |
| JP | 2005059613 A | 3/2005 | |
| JP | 2006056499 A | 3/2006 | |
| JP | 2010522112 A | 7/2010 | |
| JP | 4539283 B2 | 9/2010 | |
| JP | 5929628 B2 | 6/2016 | |
| KR | 20160093421 A * | 1/2015 | ........... B60G 17/015 |
| KR | 20200060949 A | 6/2020 | |

OTHER PUBLICATIONS

Li, CN-111140567-A, Machine Translation of Specification (Year: 2020).*
U.S. Appl. No. 18/197,126, filed May 15, 2023, Miquel Dhaens et al.
U.S. Appl. No. 18/197,133, filed May 15, 2023, Miquel Dhaens et al.
U.S. Appl. No. 18/197,138, filed May 15, 2023, Miquel Dhaens et al.

(56) References Cited

OTHER PUBLICATIONS

U.S. Appl. No. 18/197,142, filed May 15, 2023, Miquel Dhaens et al.
U.S. Appl. No. 18/324,486, filed May 26, 2023, Miquel Dhaens et al.

* cited by examiner

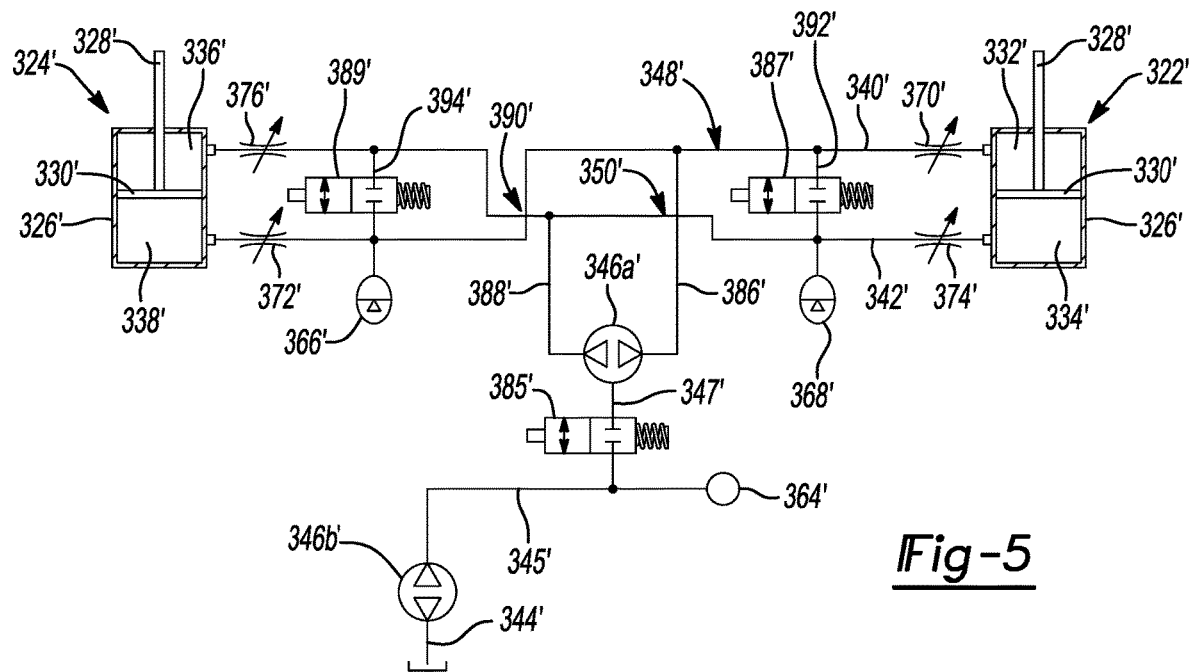
_Fig-5_
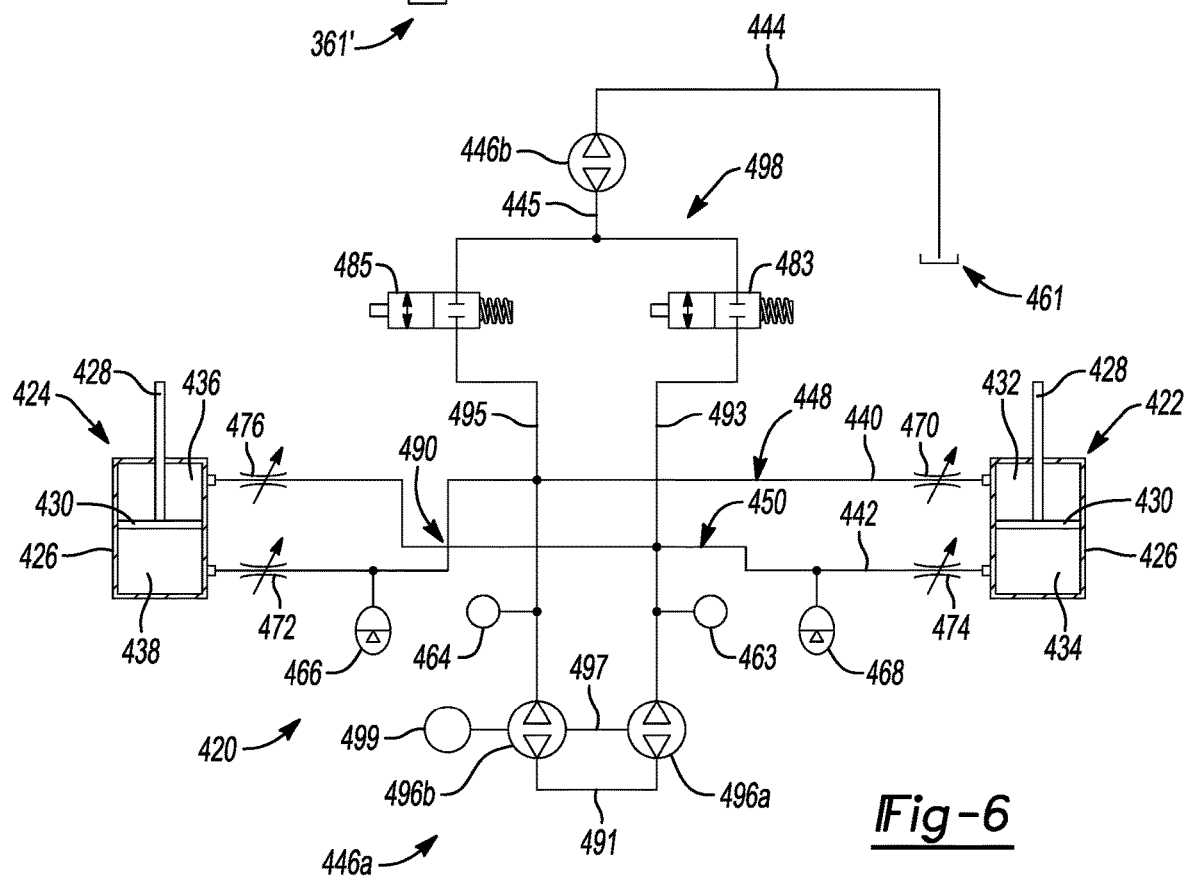
_Fig-6_

SINGLE AXLE ROLL CONTROL SYSTEM WITH MULTIPLE PRESSURIZING DEVICES ARRANGED IN SERIES

FIELD

The present disclosure relates generally to suspension systems for motor vehicles and more particularly to single axle suspension systems that replace or augment mechanical stabilizer bars/anti-roll bars.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean during corning (i.e., in turns). The lateral acceleration the vehicle experiences in turns causes a roll moment where the vehicle will lean/squat to the right when turning left and to the left when turning right. The roll moment decreases grip and cornering performance and also can be uncomfortable to the driver and passengers. Many vehicles are equipped with stabilizer bars/anti-roll bars, which are mechanical systems that help counteract the roll moment experienced during cornering. Stabilizer bars/anti-roll bars are typically mechanical linkages that extend laterally across the width of the vehicle between the right and left dampers. When one of the dampers extends, the stabilizer bar/anti-roll bar applies a force to the opposite damper that counteracts the roll moment of the vehicle and helps to correct the roll angle to provide flatter cornering. However, there are several drawbacks associated with these mechanical systems. First, there are often packaging constraints associated with mechanical systems because a stabilizer bar/anti-roll bar requires a relatively straight, unobstructed path across the vehicle between the right and left dampers. Second, stabilizer bars/anti-roll bars are reactive and therefore only work when the suspension starts moving (i.e. leaning). Such mechanical systems do not limit body roll the moment a turn is initiated. Accordingly, there remains a need for improved vehicle suspension systems that can augment or replace traditional mechanical stabilizer bars/anti-roll bars.

SUMMARY

This section provides a general summary of the disclosure, and is not a comprehensive disclosure of its full scope or all of its features.

In accordance with one aspect of the subject disclosure, a single axle suspension system is provided. The single axle suspension system includes right and left dampers. Each of the right and left dampers includes a damper housing, a piston rod, and a piston that is mounted on the piston rod. The piston is arranged in sliding engagement inside the damper housing such that the piston divides the damper housing into first and second working chambers. The first working chamber of the right damper is connected in fluid communication with the second working chamber of the left damper by a first hydraulic circuit. The second working chamber of the right damper is connected in fluid communication with the first working chamber of the left damper by a second hydraulic circuit. A first pressurizing mechanism is connected in fluid communication with the first and second hydraulic circuits. The first pressurizing mechanism is configured to adjust the roll resistance of the single axle suspension system by generating a pressure differential between the first and second hydraulic circuits independent of damper movements. A second pressurizing mechanism is connected in series with the first pressurizing mechanism. The second pressurizing mechanism is configured to adjust static pressure within the first and second hydraulic circuits by adding or removing hydraulic fluid to and from the first and second hydraulic circuits.

In accordance with another aspect of the present disclosure, the single axle suspension system includes right and left dampers. Each of the right and left dampers includes a damper housing, a piston rod, and a piston that is mounted on the piston rod. The piston is arranged in sliding engagement inside the damper housing such that the piston divides the damper housing into first and second working chambers. The single axle suspension system includes a first hydraulic line that extends between and fluidly connects the first working chamber of the right damper and the second working chamber of the left damper and a second hydraulic line that extends between and fluidly connects the second working chamber of the right damper and the first working chamber of the left damper. A first pressurizing mechanism in the form of a bi-directional pump is connected in fluid communication with the first and second hydraulic lines. The first pressurizing mechanism is configured to adjust the roll resistance of the single axle suspension system by generating a pressure differential between the first and second hydraulic lines independent of damper movements. A second pressurizing mechanism is connected in series with the first pressurizing mechanism. The second pressurizing mechanism is configured to adjust static pressure within the first and second hydraulic lines by adding or removing hydraulic fluid to and from the first and second hydraulic lines.

In accordance with another aspect of the present disclosure, the single axle suspension system includes right and left dampers. Each of the right and left dampers includes a damper housing, a piston rod, and a piston that is mounted on the piston rod. The piston is arranged in sliding engagement inside the damper housing such that the piston divides the damper housing into first and second working chambers. The first working chamber of the right damper is connected in fluid communication with the second working chamber of the left damper by a first hydraulic circuit. The second working chamber of the right damper is connected in fluid communication with the first working chamber of the left damper by a second hydraulic circuit. A first pressurizing mechanism is connected in fluid communication with the first and second hydraulic circuits and a second pressurizing mechanism is connected to the first pressurizing mechanism by one or more hydraulic lines. One or more shut-off valves are positioned in the hydraulic line(s) extending between the first and second pressurizing mechanisms. The first pressurizing mechanism is configured to adjust roll resistance of the single axle suspension system by generating a pressure differential between the first and second hydraulic circuits, independent of damper movements, when the shut-off valve(s) are closed. The second pressurizing mechanism is configured to adjust static pressure within the first and second hydraulic circuits by adding or removing hydraulic fluid to and from the hydraulic line(s) extending between the first and second pressurizing mechanisms when the shut-off valve(s) are open.

Advantageously, the single axle suspension systems described herein are able to reduce/eliminate vehicle roll while cornering for improved grip, performance, handling, and braking. The reduction of roll angles improves the comfort, steering feel, agility, and stability of the vehicle. Roll control is provided by actuating the first and second pressurizing mechanisms to increase the roll stiffness of the suspension system based on static pressure in the system. Because the pressurizing mechanisms actively adjusts roll stiffness of the vehicle by changing the static pressure in the system when greater roll stiffness is need, the baseline roll stiffness can be reduced compared to a vehicle with a conventional anti-roll bar. Therefore, ride comfort and suspension compliance is improved. Comfort is also improved because the active forces are independent of the damping forces. Anti-roll stiffness can also be applied to reduce body oscillations (e.g. sway) resulting in improved comfort. Finally, the single axle suspension systems described herein provide anti-roll control and therefore can augment or replace mechanical stabilizer bars/anti-roll bars.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is a schematic diagram illustrating another exemplary single axle suspension system that is constructed in accordance with the present disclosure, where the single axle suspension system includes a first pressurizing mechanism in the form of a first bi-directional pump that is arranged in series with a second pressurizing mechanism in the form of a second bi-directional pump;

FIG. 6 is a schematic diagram illustrating another exemplary single axle suspension system that is constructed in accordance with the present disclosure, where the single axle suspension system includes a first pressurizing mechanisms in the form of a dual impeller bi-directional pump that is arranged in series with a second pressurizing mechanism in the form of a single impeller bi-directional pump;

DETAILED DESCRIPTION

Figure 1:
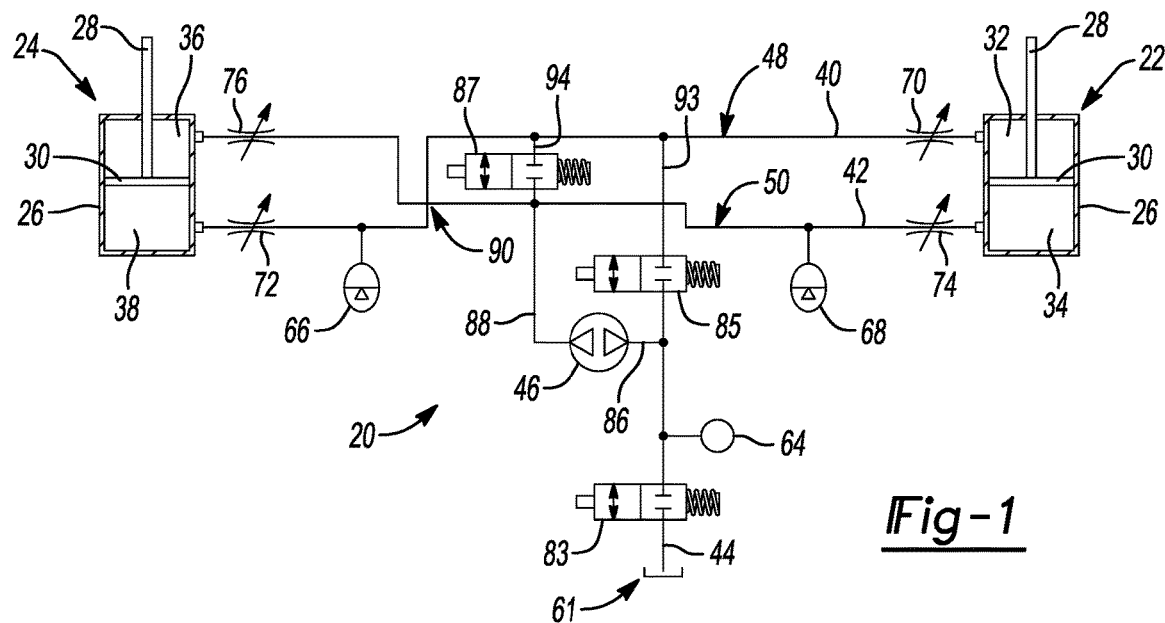
FIG. 1 is a schematic diagram illustrating an exemplary single axle suspension system that is constructed in accordance with the present disclosure, where the single axle suspension system includes a first pressurizing mechanisms in the form of a bi-directional pump.

Referring to the Figures, wherein like numerals indicate corresponding parts throughout the several views, a number of single axle suspension system are disclosed.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-6, several single axle suspension systems are illustrated. It should be appreciated that the single axle suspension systems shown in FIGS. 1-6 may be located at the front end of a vehicle to control suspension movements and provide anti-roll/lean control for the front wheels of the vehicle, and additionally or alternatively, the single axle suspension systems may be located at the rear end of the vehicle to control suspension movements and provide anti-roll/lean control for the back wheels of the vehicle.

Each of the single axle suspension systems disclosed herein include a right damper and a left damper. The right and left dampers control (i.e., dampen) up and down (i.e., vertical) movements of the front or rear wheels of the vehicle. Thus, one single axle suspension system may be provided at the front of the vehicle and another single axle suspension system may be provided at the rear of the vehicle. The anti-roll/lean capabilities of the single axle suspension systems described herein will be explained in greater detail below; however, it should be appreciated that each single axle suspension system can operate independently and on its own and that each single axle suspension systems can be used to either augment or completely replace mechanical stabilizer bars/anti-roll bars. Such mechanical systems require relatively straight, unobstructed runs along each axle between the right and left dampers. Accordingly, the single axle suspension systems disclosed herein offer packaging benefits because the right and left dampers only need to be hydraulically connected to one another.

It should be appreciated that a vehicle may be equipped with two identical single axle suspension systems placed at the front and rear of the vehicle; however, other configurations are possible where the vehicle may include only one of the single axle suspension systems disclosed herein and a convention suspension system at the other axle, or where the single axle suspension system at the front of the vehicle is different from the single axle suspension system at the rear of the vehicle.

With reference to FIG. 1, a single axle suspension system 20 is illustrated with right and left dampers 22, 24. Each of the right and left dampers 22, 24 of the single axle suspension system 20 includes a damper housing 26, a piston rod 28, and a piston 30 that is mounted on the piston rod 28. The piston 30 is arranged in sliding engagement with the inside of the damper housing 26 such that the pistons 30 divide the damper housings 26 into first and second working chambers 32, 34, 36, 38. Although other configurations are possible, in the illustrated embodiment the pistons 30 in the right and left dampers 22, 24 are closed pistons with no fluid flow paths defined within or by their structure.

The single axle suspension system 20 also includes a first hydraulic line 40 that extends between and fluidly connects to the first working chamber 32 of the right damper 22 and the second working chamber 38 of the left damper 24 and a second hydraulic line 42 that extends between and fluidly connects to the second working chamber 34 of the right damper 22 and the first working chamber 36 of the left damper 24. As such, the first and second hydraulic lines 40, 42 cross-over one another at a cross-over point 90. In the illustrated example, the hydraulic lines 40, 42 are made of flexible tubing (e.g., hydraulic hoses), but other conduit structures and/or fluid passageways can be used alone or in combination with one another. The first hydraulic line 40 thus forms at least part of a first hydraulic circuit 48 that interconnects the first working chamber 32 of the right damper 22 and the second working chamber 38 of the left damper 24. Meanwhile, the second hydraulic line 42 forms at least part of a second hydraulic circuit 50 that interconnects the second working chambers 34 of the right damper 22 and the first working chamber 36 of the left damper 24.

The first hydraulic circuit 48 includes a first accumulator 66 and the second hydraulic circuit 50 includes a second accumulator 68. The first accumulator 66 is connected in fluid communication with the first hydraulic line 40 and the second accumulator 68 is connected in fluid communication with the second hydraulic line 42. The first and second accumulators 66, 68 may be constructed in a number of different ways. For example and without limitation, the first and second accumulators 66, 68 may have accumulation chambers and pressurized gas chambers that are separated by floating pistons or flexible membranes.

The first hydraulic circuit 48 also includes a first pair of variable flow control valves 70, 72 that are configured to regulate fluid flow between the first working chamber 32 of the right damper 22 and the second working chamber 38 of the left damper 24 with the first hydraulic circuit 48. Similarly, the second hydraulic circuit 50 also includes a second pair of variable flow control valves 74, 76 that are configured to regulate fluid flow between the first working chambers 36 of the left damper 24 and the second working chamber 34 of the right damper 22 with the second hydraulic circuit 50. The first variable flow control valve 70 is positioned between the first working chamber 32 of the right damper 22 and the first hydraulic line 40, while the second variable flow control valve 72 is positioned between the second working chamber 38 of the left damper 24 and the first hydraulic line 40. The third variable flow control valve 74 is positioned between the second working chamber 34 of the right damper 22 and the second hydraulic line 42, while the fourth variable flow control valve 76 is positioned between the first working chamber 36 of the left damper 24 and the second hydraulic line 42. By way of example and without limitation, the variable flow control valves 70, 72, 74, 76 may be electromechanical valves with a combination of passive spring-disk elements and a solenoid. The solenoid of the variable flow control valves 70, 72, 74, 76 may be electrically connected to and actuated by the controller 60 to change the damping characteristics of the right damper 22 and/or left damper 24 (e.g., to soften or firm up the ride).

The single axle suspension system 20 also includes a pressurizing mechanism 46 that is connected in fluid communication with the first and second hydraulic circuits 48,

50. The pressurizing mechanism 46 shown in FIG. 1 is a bi-directional pump that is configured to provide active roll control (i.e., roll resistance) by adding and removing hydraulic fluid to and from the first and second hydraulic circuits 48, 50 to increase and decrease pressure inside the first and second hydraulic circuits 48, 50 independent of damper movements. The bi-directional pump of the pressurizing mechanism 46 shown in FIG. 1 has a single impeller that rotatably driven by a motor. The motor of the pressurizing mechanism 46 is configured to rotate the impeller in a first rotational direction (e.g., clockwise rotation) when the pressurizing mechanism 46 is operating in a first working mode, while the motor of the pressurizing mechanism 46 is configured to rotate the impeller in a second rotational direction (e.g., counter-clockwise rotation) when the pressurizing mechanism 46 is operating in a second working mode.

The bi-directional pump of the pressurizing mechanism 46 is connected to the first and second bi-directional conduits 86, 88, which are arranged in fluid communication with the first and second hydraulic circuits 48, 50. The first bi-directional conduit 86 acts as a pump outlet and the second bi-directional conduit 88 acts as a pump inlet when the bi-directional pump is operating in the first working mode. By contrast, the first bi-directional conduit 86 acts as the pump inlet and the second bi-directional conduit 88 acts as the pump outlet when the bi-directional pump is operating in the second working mode. Thus, the pressurizing mechanism 46 is configured to pump hydraulic fluid into or out of the first and second hydraulic circuits 48, 50 to increase or decrease static pressure in the first and second hydraulic circuits 48, 50 depending on the working mode.

The first bi-directional conduit 86 and therefore the bi-directional pump of the pressurizing mechanism 46 is connected to a reservoir 61 via a third hydraulic line 44 that extends between the first bi-directional conduit 86 and the reservoir 61. The first bi-directional conduit 86 and therefore the bi-directional pump of the pressurizing mechanism 46 is also connected to the first hydraulic line 40 and therefore the first hydraulic circuit 48 via a first charge line 93 that extends between the first bi-directional conduit 86 and the first hydraulic line 40. The second bi-directional conduit 88 is connected to the second hydraulic line 42 and therefore the second hydraulic circuit 50. In other words, the second bi-directional conduit 88 extends between the second hydraulic line 42 and the bi-directional pump of the pressurizing mechanism 46. A second charge line 94 extends from the junction between the second bi-directional conduit 88 is connected to the second hydraulic line 42 and interconnects the second hydraulic line 42 and therefore the second hydraulic circuit 50 with the first hydraulic line 40 and therefore the first hydraulic circuit 48.

The single axle suspension system 20 also includes a number of shut-off (i.e., on/off) valves 83, 85, 87, including a first shut-off valve 83 that is positioned in the third hydraulic line 44 between the first bi-directional conduit 86 and the reservoir 61, a second shut-off valve 85 that is positioned in the first charge line 93 between the first bi-directional conduit 86 and the first hydraulic line 40, and a third shut-off valve 87 that is positioned in the second charge line 94 between the first and second hydraulic lines 40, 42. By way of example and without limitation, the shut-off valves 83, 85, 87 may be electromechanical valves with a solenoid that may be electrically connected to and actuated by the controller (not shown in FIG. 2) to open and close the shut-off valves 83, 85, 87.

The bi-directional pump of the pressurizing mechanism 46 shown in FIG. 1 is configured to provide roll resistance in the first working mode by pumping hydraulic fluid out of the second hydraulic circuit 50 and into the first hydraulic circuit 48 when the first and third shut-off valves 83, 87 are closed and the second shut-off valve 85 is open. This results in an increase in static pressure within the first hydraulic circuit 48 and a decrease in static pressure within the second hydraulic circuit 50, which is useful to resist body roll to the left when the vehicle is in a right-hand turn. The bi-directional pump of the pressurizing mechanism 46 shown in FIG. 1 is configured to provide roll resistance in the second working mode by pumping hydraulic fluid out of the first hydraulic circuit 48 and into the second hydraulic circuit 50 when the first and third shut-off valves 83, 87 are closed and the second shut-off valve 85 is open. This results in a decrease in static pressure within the first hydraulic circuit 48 and an increase in static pressure within the second hydraulic circuit 50, which is useful to resist body roll to the right when the vehicle is in a left-hand turn. As such, it should be appreciated that a pressure differential between the first and second hydraulic circuits 48, 50 can be generated and maintained to provide roll resistance when the third shut-off valve 87 is closed, and that the pressure differential will equalize when the third shut-off valve 87 is open, which can be used to provide a comfort setting/operating mode. It should also be appreciated that with the first and third shut-off valves 83, 87 open and the second shut-off valve 85 closed, the bi-directional pump of the pressurizing mechanism 46 can be run in the first working mode to pump fluid out of the first and second hydraulic circuits 48, 50 and into the reservoir 61 to reduce the static pressure in the first and second hydraulic circuits 48, 50, or alternatively can be run in the second working mode to pump fluid out of the reservoir 61 and into the first and second hydraulic circuits 48, 50 to increase the static pressure in the first and second hydraulic circuits 48, 50. This can be used to increase or decrease the dampening and roll stiffness of the suspension system 20 and/or can be used to change the ride height of the vehicle.

Figure 2:
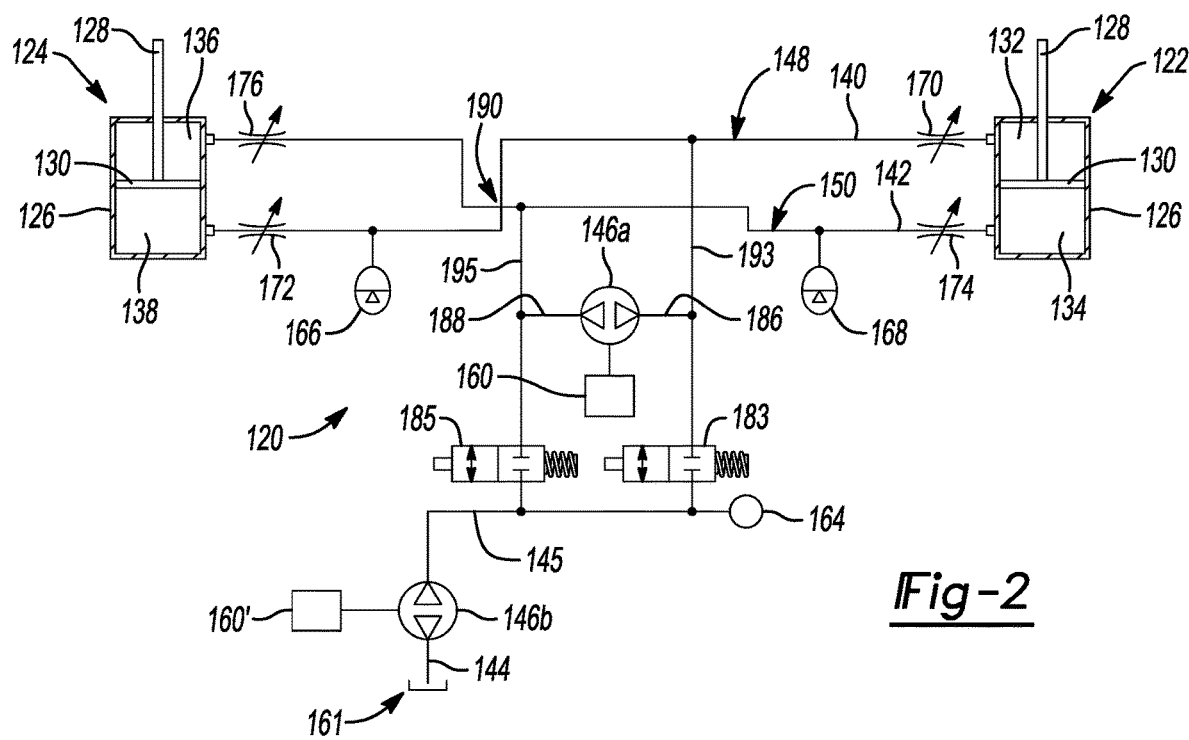
FIG. 2 is a schematic diagram illustrating another exemplary single axle suspension system that is constructed in accordance with the present disclosure, where the single axle suspension system includes first and second pressurizing mechanisms in the form of two bi-directional pumps that are arranged in series.

The pressurizing mechanism 46, the variable flow control valves 70, 72, 74, 76, and the shut-off valves 83, 85, 87 may all be electrically connected to and controlled by one or more controllers (as shown in FIG. 2). The controller(s) are programmed to initiate/perform active roll control operations and may be responsive to measurements taken by one or more pressure sensors 64. As shown in FIG. 1, the pressure sensor 64 may be connected to the third hydraulic line 44 between the first bi-directional conduit 86 and the first shut-off valve 83.

FIG. 2 illustrates another single axle suspension system 120 that shares many of the same components as the single axle suspension system 20 illustrated in FIG. 1, but in FIG. 2 the single axle suspension system 120 includes first and second pressurizing mechanisms 146a, 146b in the form of two bi-directional pumps that are arranged in series with one another. Rather than repeat the description set forth above, the reference numbers in FIG. 2 are the same as those shown in FIG. 1, but in FIG. 2 the reference numbers are "100" series numbers (e.g., 120, 122, 124, etc.), but otherwise share the same base reference numbers as the corresponding elements in FIG. 1. Thus, the same description for elements 20, 22, 24 above applies to elements 120, 122, 124 in FIG. 2 and so on and so forth, except as otherwise noted.

The first pressurizing mechanism 146a of the single axle suspension system 120 illustrated in FIG. 2 is a bi-directional pump that is connected in fluid communication with the first and second hydraulic circuits 148, 150 to provide active roll control (i.e., roll resistance) by adding and removing hydraulic fluid to and from the first and second hydraulic circuits 148, 150, which increases and decreases the static pressure inside the first and second hydraulic circuits 148, 150 independent of damper movements. The second pressurizing mechanism 146b of the single axle suspension system 120 illustrated in FIG. 2 is a bi-directional pump that is connected in fluid communication with a reservoir 161 via a third hydraulic line 144 and the first pressurizing mechanism via a fourth hydraulic line 145. Each bi-directional pump of the first and second pressurizing mechanisms 146a, 146b has a single impeller that rotatably driven by a motor in either a first rotational direction (e.g., clockwise rotation) to provide a first working mode or a second rotational direction (e.g., counter-clockwise rotation) to provide a second working mode.

The bi-directional pump of the first pressurizing mechanism 146a is connected to first and second bi-directional conduits 186, 188, which are arranged in fluid communication with the first and second hydraulic circuits 148, 150. The first bi-directional conduit 186 acts as a pump outlet and the second bi-directional conduit 188 acts as a pump inlet of the first pressurizing mechanism 146a when the bi-directional pump of the first pressurizing mechanism 146a is operating in the first working mode. By contrast, the first bi-directional conduit 86 acts as the pump inlet and the second bi-directional conduit 88 acts as the pump outlet of the first pressurizing mechanism 146a when the bi-directional pump of the first pressurizing mechanism 146a is operating in the second working mode. Thus, the first pressurizing mechanism 146a is configured to pump hydraulic fluid into or out of the first and second hydraulic circuits 148, 150 to increase or decrease static pressure in the first and second hydraulic circuits 148, 150 depending on the working mode of the first pressurizing mechanism 146a.

The third hydraulic line 144 acts as a pump outlet and the fourth hydraulic line 145 acts as a pump inlet of the second pressurizing mechanism 146b when the bi-directional pump of the second pressurizing mechanism 146b is operating in the first working mode. By contrast, the third hydraulic line 144 acts as the pump inlet and the fourth hydraulic line 145 acts as the pump outlet of the second pressurizing mechanism 146b when the bi-directional pump of the second pressurizing mechanism 146b is operating in the second working mode. Thus, the second pressurizing mechanism 146b is configured to pump hydraulic fluid into or out of the reservoir 161 to increase or decrease static pressure in both the first and second hydraulic circuits 148, 150 depending on the working mode of the second pressurizing mechanism 146b.

The first bi-directional conduit 186 and therefore the bi-directional pump of the first pressurizing mechanism 146 is connected to the first hydraulic line 140 and therefore the first hydraulic circuit 148 via a first charge line 193 that extends between the first and fourth hydraulic lines 140, 145. The second bi-directional conduit 188 is connected to the second hydraulic line 142 and therefore the second hydraulic circuit 150 via a second charge line 194 that extends between the second and fourth hydraulic lines 142, 145.

The single axle suspension system 120 illustrated in FIG. 2 includes a first shut-off valve 183 that is positioned in the first charge line 193 between the first bi-directional conduit 186 and the fourth hydraulic line 145 and a second shut-off valve 185 that is positioned in the second charge line 194 between the second bi-directional conduit 188 and the fourth hydraulic line 145. By way of example and without limitation, the shut-off valves 183, 185 may be electromechanical valves with a solenoid that may be electrically connected to and actuated by one or more controller(s) 160, 160' to open and close the shut-off valves 183, 185.

The bi-directional pump of the first pressurizing mechanism 146a shown in FIG. 2 is configured to provide roll resistance in the first working mode by pumping hydraulic fluid out of the second hydraulic circuit 150 and into the first hydraulic circuit 148 when the first and second shut-off valves 183, 185 are closed. This results in an increase in static pressure within the first hydraulic circuit 148 and a decrease in static pressure within the second hydraulic circuit 150, which is useful to resist body roll to the left when the vehicle is in a right-hand turn. The bi-directional pump of the pressurizing mechanism 146 shown in FIG. 2 is configured to provide roll resistance in the second working mode by pumping hydraulic fluid out of the first hydraulic circuit 148 and into the second hydraulic circuit 150 when the first and second shut-off valves 183, 185 are closed. This results in a decrease in static pressure within the first hydraulic circuit 148 and an increase in static pressure within the second hydraulic circuit 150, which is useful to resist body roll to the right when the vehicle is in a left-hand turn. As such, it should be appreciated that a pressure differential between the first and second hydraulic circuits 148, 150 can be generated and maintained to provide roll resistance when the first and second shut-off valves 183, 185 are closed. The pressure differential will equalize when the first and second shut-off valves 183, 185 are open, which can be used to provide a comfort setting/operating mode.

The bi-directional pump of the second pressurizing mechanism 146b can be run in the first working mode to pump fluid out of both of the first and second hydraulic circuits 148, 150 and into the reservoir 161 to reduce the static pressure in the first and second hydraulic circuits 148, 150 when the first and second shut-off valves 183, 185 are open. Alternatively, the bi-directional pump of the second pressurizing mechanism 146b can be run in the first working mode to pump fluid out of just the first hydraulic circuit 148 or just the second hydraulic circuit 150 and into the reservoir 161 to reduce the static pressure in just one of the first and second hydraulic circuits 148, 150 by opening just one of the first and second shut-off valves 183, 185. Similarly, the bi-directional pump of the second pressurizing mechanism 146b can be run in the second working mode to pump fluid out of the reservoir 161 and into both of the first and second hydraulic circuits 148, 150 to increase the static pressure in the first and second hydraulic circuits 148, 150 when the first and second shut-off valves 183, 185 are open. Alternatively, the bi-directional pump of the second pressurizing mechanism 146b can be run in the second working mode to pump fluid out of the reservoir 161 and into just the first hydraulic circuit 148 or just the second hydraulic circuit 150 to increase the static pressure in just one of the first and second hydraulic circuits 148, 150 by opening just one of the first and second shut-off valves 183, 185.

The pressurizing mechanisms 146a, 146b, the variable flow control valves 170, 172, 174, 176, and the shut-off valves 183, 185 may all be electrically connected to and controlled by the controllers 160, 160'. Each of the controllers 160, 160' includes a processor and memory that is programmed to initiate/perform active roll control operations by actuating the first and second pressurizing mechanism 146a, 146b either simultaneously or independently. The controllers 160, 160' may be responsive to measurements taken by one or more pressure sensors 164. As shown in FIG. 2, the pressure sensor 164 may be connected to the fourth hydraulic line 145. In the illustrated example, a first controller 160 is electronically connected to the motor of the first pressurizing mechanism 146a and a second controller 160' is electronically connected to the motor the second pressurizing mechanism 146b. However, it should be appreciated that the suspension system 120 could alternatively include a single controller that is connected to both of the pressurizing mechanisms 146a, 146b.

Figure 3:
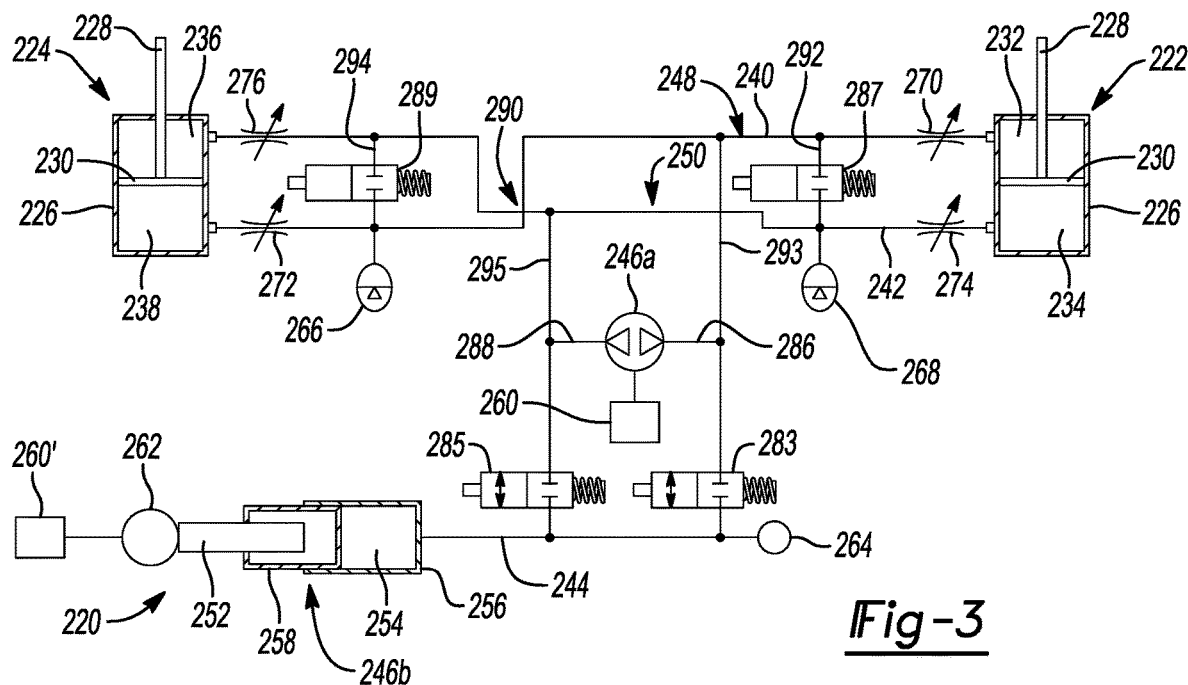
FIG. 3 is a schematic diagram illustrating another exemplary single axle suspension system that is similar to the single axle suspension system illustrated in FIG. 2, but where the second pressurizing mechanism includes a driven piston and a variable volume chamber.

FIG. 3 illustrates another single axle suspension system 220 that shares many of the same components as the single axle suspension system 120 illustrated in FIG. 2, but the reservoir 161 and bi-directional pump of the second pressurizing mechanism 146b shown in FIG. 2 have been replaced with a second pressurizing mechanism 246b that includes a ball/screw mechanism 252 that controls the volume of a variable volume chamber 254 in FIG. 3. Rather than repeat the description set forth above, the following paragraphs describe the structure and function of the components in FIG. 3 that are new and/or different from those shown and described in connection with FIGS. 1 and 2. It should be appreciated that the reference numbers in FIG. 3 are "200" series numbers (e.g., 220, 222, 224, etc.), but otherwise share the same base reference numbers as the corresponding elements in FIGS. 1 and 2. Thus, the same description for elements 20, 120 above applies to element 220 in FIG. 3 and so on and so forth, except as otherwise noted.

The second pressurizing mechanism 246b includes a ball/screw mechanism 252 to adjust the volume of the variable volume chamber 254, which allows the second pressurizing mechanism 246b to add and remove hydraulic fluid to and from the first and/or second hydraulic circuits 248, 250. The second pressurizing mechanism 246b also includes a cylinder 256 and the ball/screw mechanism 252 is configured to actuate a driven piston 258 that is slidably received in the cylinder 256. In particular, the second pressurizing mechanism 246b includes a motor 262 that is controlled by controller 260' to rotate the ball/screw mechanism 252 in clockwise and counterclockwise directions, which in turn drives linear movement of the driven piston 258 in opposite directions. The driven piston 258 is moveable in a first direction to decrease the volume of the variable volume chamber 254 within the cylinder 256 and push hydraulic fluid out of the variable volume chamber 254 and into the third hydraulic line 244, which will increase the static pressure in the first and/or second hydraulic circuits 250 depending on which shut-off valves 283, 285 are open. The driven piston 258 is also moveable in a second direction to increase the volume of the variable volume chamber 254 within the cylinder 256 and draw hydraulic fluid from the third hydraulic line 244 into the variable volume chamber 254, which will decrease the static pressure in the first and/or second hydraulic circuits 248, 250 depending on which shut-off valves 283, 285 are open. Thus, actuation of the second pressurizing mechanism 246b either increases or decreases the static pressure inside the first hydraulic circuit 248 if the first shut-off valve 283 is open and the second shut-off valve 285 is closed, the second hydraulic circuit 250 if the first shut-off valve 283 is closed and the second shut-off valve 285 is open, or both the first and second hydraulic circuits 248, 250 if both shut-off valves 283, 285 are open.

The suspension system 220 illustrated in FIG. 3 also includes first and second bridge lines 292, 294 that extend between and interconnect the first hydraulic line 240 and therefore the first hydraulic circuit 248 and the second hydraulic line 242 and therefore the second hydraulic circuit 250 on each side of the cross-over point 290. In other words, the first bridge line 292 connects to the first and second hydraulic lines 240, 242 at positions located between the right damper 222 and the cross-over point 290, while the second bridge line 294 connects to the first and second hydraulic lines 240, 242 at positions located between the left damper 224 and the cross-over point 290. A third shut-off valve 287 is positioned in the first bridge line 292 between the first and second hydraulic lines 240, 242 and a fourth shut-off valve 289 is positioned in the second bridge line 294 between the first and second hydraulic lines 240, 242. When the shut-off valves 283, 285, 287, 289 are closed, a pressure differential between the first and second hydraulic circuits 248, 250 can be generated and maintained to provide roll resistance. This pressure differential will equalize when the shut-off valves 283, 285, 287, 289 are open, which can be used to provide a comfort setting/operating mode. By way of example and without limitation, the shut-off valves shut-off valves 283, 285, 287, 289 may be electromechanical valves with a solenoid that may be electrically connected to and actuated by the controller 260' to open and close the shut-off valves shut-off valves 283, 285, 287, 289. Finally, in FIG. 3, the first accumulator 266 is connected at the junction between the first bridge line 292 and the second hydraulic line 242 and the second accumulator 268 is connected at the junction between the second bridge line 294 and the second hydraulic line 242.

Figure 4:
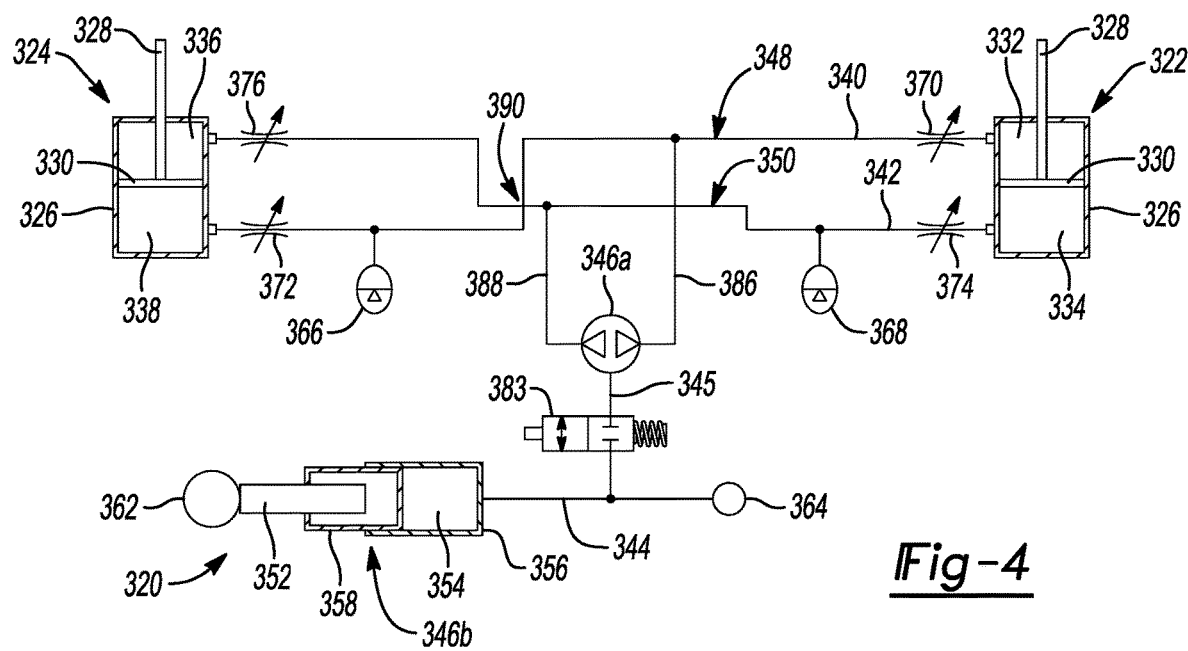
FIG. 4 is a schematic diagram illustrating another exemplary single axle suspension system that is constructed in accordance with the present disclosure, where the single axle suspension system includes a first pressurizing mechanism in the form of a bi-directional pump that is arranged in series with a second pressurizing mechanism that includes a driven piston and a variable volume chamber.

FIG. 4 illustrates another single axle suspension system 320 that shares many of the same components as the single axle suspension system 220 illustrated in FIG. 3, but in FIG. 4 the first and second bridge lines 292, 294 and the first and second charge lines 293, 295 shown in FIG. 3 have been eliminated. Rather than repeat the description set forth above, the reference numbers in FIG. 4 are the same as those shown in FIGS. 1-3, but in FIG. 4 the reference numbers are "300" series numbers (e.g., 320, 322, 324, etc.), but otherwise share the same base reference numbers as the corresponding elements in FIGS. 1-3. Thus, the same description for elements 20, 120, 220 above applies to element 320 in FIG. 4 and so on and so forth, except as otherwise noted.

The bi-directional pump of the first pressurizing mechanism 346a in FIG. 4 is connected to first and second bi-directional conduits 386, 388, which extend between and connect the bi-directional pump of the first pressurizing mechanism 346a to the first and second hydraulic lines 340, 342 and therefore the first and second hydraulic circuits 348, 350. A third hydraulic line 344 is connected to the variable volume chamber 354 of the second pressurizing mechanism 346b and a fourth hydraulic line 345 extends between and connects the third hydraulic line 344 with the bi-directional pump of the first pressurizing mechanism 346a. A shut-off valve 383 is positioned in the fourth hydraulic line 345 between the third hydraulic line 344 and the bi-directional pump of the first pressurizing mechanism 346a. When the shut-off valve 383 is closed, the bi-directional pump of the first pressurizing mechanism 346a may be run in the first and second working modes to pump hydraulic fluid from the first hydraulic circuit 348 to the second hydraulic circuit 350 and vice versa to provide roll resistance by changing the static pressure within the first and second hydraulic circuits 348, 350. When the shut-off valve 383 is open, the ball/screw mechanism 352 of the second pressurizing mechanism 346b may be actuated to force hydraulic fluid into or out of the volume of the variable volume chamber 354 of the second pressurizing mechanism 346b and therefore increase or decrease the static pressure in both the first and second hydraulic circuits 348, 350.

FIG. 5 illustrates another single axle suspension system 320' that shares many of the same components as the single axle suspension system 320 illustrated in FIG. 4, but in FIG. 5 the second pressurization mechanism 346b' is a bi-directional pump and therefore lacks the ball/screw mechanism 352 and variable volume chamber 354 of the second pressurization mechanism 346b illustrated in FIG. 4. Rather than repeat the description set forth above, the reference numbers in FIG. 5 are the same as those shown in FIG. 4, but in FIG. 5 the reference numbers have been annotated with the prime (') symbol, but otherwise share the same base reference numbers as the corresponding elements in FIG. 4. Thus, the same description for elements 320 above applies to element 320' in FIG. 5 and so on and so forth, except as otherwise noted.

The bi-directional pump of the first pressurizing mechanism 346a' in FIG. 5 is connected to first and second bi-directional conduits 386', 388', which extend between and connect the bi-directional pump of the first pressurizing mechanism 346a' to the first and second hydraulic lines 340', 342' and therefore the first and second hydraulic circuits 348', 350'. The bi-directional pump of the second pressurizing mechanism 346b' is connected to a reservoir 361' by a third hydraulic line 344' and is also connected a fourth hydraulic line 345' that extends between the bi-directional pump of the second pressurizing mechanism 346b' and a pressure sensor 364'. A fifth hydraulic line 347' extends between and connects the fourth hydraulic line 345' with the bi-directional pump of the first pressurizing mechanism 346a'. A shut-off valve 385' is positioned in the fifth hydraulic line 347' between the fourth hydraulic line 345' and the bi-directional pump of the first pressurizing mechanism 346a'. When the shut-off valve 385' is closed, the bi-directional pump of the first pressurizing mechanism 346a' may be run in the first and second working modes to pump hydraulic fluid from the first hydraulic circuit 348' to the second hydraulic circuit 350' and vice versa to provide roll resistance by changing the static pressure within the first and second hydraulic circuits 348', 350'. When the shut-off valve 385' is open, the bi-directional pump of the second pressurizing mechanism 346b' may be activated to pump hydraulic fluid into or out of the fourth hydraulic line 345' and therefore increase or decrease the static pressure in both the first and second hydraulic circuits 348', 350'.

FIG. 6 illustrates another single axle suspension system 420 that shares many of the same components as the single axle suspension system 120 illustrated in FIG. 2, but in FIG. 6 the first pressurizing mechanism 446a is a dual impeller bi-directional pump. Rather than repeat the description set forth above, the following paragraphs describe the structure and function of the components in FIG. 6 that are new and/or different from those shown and described in connection with FIG. 2. It should be appreciated that the reference numbers in FIG. 6 are "400" series numbers (e.g., 420, 422, 424, etc.), but otherwise share the same base reference numbers as the corresponding elements in FIG. 2. Thus, the same description for element 120 above applies to element 420 in FIG. 6 and so on and so forth, except as otherwise noted.

The first pressurizing mechanism 446a in FIG. 6 is dual impeller bi-directional pump and includes a first impeller 496a and a second impeller 496b. By contrast, the second pressurizing mechanism 446b is a bi-directional pump with a single impeller. The first and second impellers 496a, 496b of the first pressurizing mechanism 446a are interconnected by a bridge line 491 and are supported on and mounted to a common shaft 497, which is rotationally driven by a motor 499 (i.e., an electric motor). The motor 499 may be connected to one or more controllers (not shown in FIG. 6) programmed to initiate active roll control operations. The controller(s) may be responsive to measurements taken by first and second pressure sensors 463, 464 that are connected to first and second charge lines 493, 495, respectively. The first impeller 496a is arranged in fluid communication with and is configured to pump fluid through the first charge line 493 and the bridge line 491 in two opposing directions depending on the rotational direction that the first impeller 496a is turning in (e.g., clockwise or counterclockwise). The second impeller 496b is arranged in fluid communication with and is configured to pump fluid through the second charge line 495 and the bridge line 491 in two opposing directions depending on the rotational direction that the second impeller 496b is turning in (e.g., clockwise or counterclockwise).

The bi-directional pump of the second pressurizing mechanism 446b is connected in fluid communication with third and fourth hydraulic lines 444, 445. The third hydraulic line 444 extends between and interconnects the bi-directional pump of the second pressurizing mechanism 446b with a reservoir 461. The bi-directional pump of the second pressurizing mechanism 446b can be run in opposite rotational directions to pump fluid between the third and fourth hydraulic lines 444, 445 and therefore into or out of the reservoir 461. The bridge line 491 extends between the first and second impellers 495a, 495b of the first pressurizing mechanism 446a, the first charge line 493 extends between the first impeller 495a of the first pressurizing mechanism 446a and the fourth hydraulic line 445, and the second charge line 495 extends between the second impeller 495b of the first pressurizing mechanism 446a and the fourth hydraulic line 445. Thus, the fourth hydraulic line 445 and the first and second charge lines 493, 495 come together at a junction and the bridge line 491 and the first and second charge lines 493, 495 collectively form a charging loop 498 that is arranged in communication with the bi-directional pump of the second pressurizing mechanism 446b via the fourth hydraulic line 445.

The single axle suspension system 420 illustrated in FIG. 6 also includes a first shut-off valve 483 that is positioned in the first charge line 493 between the first impeller 496a of the first pressurizing mechanism 446a and the fourth hydraulic line 445 and a second shut-off valve 485 that is positioned in the second charge line 494 between the second impeller 496b of the first pressurizing mechanism 446a and the fourth hydraulic line 445. By way of example and without limitation, the shut-off valves 483, 485 may be electromechanical valves with a solenoid that may be electrically connected to and actuated by one or more controller(s) to open and close the shut-off valves 483, 485. The first charge line 493 is connected in fluid communication with the second hydraulic line 442 of the second hydraulic circuit 450 at a location between the first impeller 496a of the first pressurizing mechanism 446a and the first shut-off valve 483. The second charge line 495 is connected in fluid communication with the first hydraulic line 440 of the first hydraulic circuit 448 at a location between the second impeller 496b of the first pressurizing mechanism 446a and the second shut-off valve 485.

The dual impeller bi-directional pump of the first pressurizing mechanism 446a is configured such that the first and second impellers 496a, 496b rotate in the same direction and simultaneously pump hydraulic fluid through at least portions of the charging loop 498 in either a clockwise direction or a counter-clockwise direction.

The dual impeller bi-directional pump of the first pressurizing mechanism 446a is configured to run in a first working mode where the first impeller 496a pumps fluid from the first charge line 493 to the bridge line 491 and the second impeller 496b pumps fluid from the bridge line 491 to the second charge line 495. Because the first charge line 493 is arranged in fluid communication with the second hydraulic line 442 of the second hydraulic circuit 450 and the second charge line 495 is arranged in fluid communication with the first hydraulic line 440 of the first hydraulic circuit 448, it should be appreciated that the dual impeller bi-directional pump of the first pressurizing mechanism 446a provides roll resistance in the first working mode by pumping hydraulic fluid out of the second hydraulic circuit 450 and into the first hydraulic circuit 448 when the first and second shut-off valves 483, 485 are closed. This results in an increase in static pressure within the first hydraulic circuit 448 and a decrease in static pressure within the second hydraulic circuit 450, which is useful to resist body roll to the left when the vehicle is in a right-hand turn.

The dual impeller bi-directional pump of the first pressurizing mechanism 446a is configured to run in a second working mode where the second impeller 496b pumps fluid from the second charge line 495 to the bridge line 491 and the first impeller 496a pumps fluid from the bridge line 491 to the first charge line 493. Because the first charge line 493 is arranged in fluid communication with the second hydraulic line 442 of the second hydraulic circuit 450 and the second charge line 495 is arranged in fluid communication with the first hydraulic line 440 of the first hydraulic circuit 448, it should be appreciated that the dual impeller bi-directional pump of the first pressurizing mechanism 446a provides roll resistance in the second working mode by pumping hydraulic fluid out of the first hydraulic circuit 448 and into the second hydraulic circuit 450 when the first and second shut-off valves 483, 485 are closed. This results in a decrease in static pressure within the first hydraulic circuit 448 and an increase in static pressure within the second hydraulic circuit 450, which is useful to resist body roll to the right when the vehicle is in a left-hand turn. As such, it should be appreciated that a pressure differential between the first and second hydraulic circuits 448, 450 can be generated and maintained to provide roll resistance when the first and second shut-off valves 483, 485 are closed. The pressure differential will equalize when the first and second shut-off valves 483, 485 are open, which can be used to provide a comfort setting/operating mode.

The bi-directional pump of the second pressurizing mechanism 446b can be run in the first working mode to pump fluid out of the charging loop 498 and therefore both of the first and second hydraulic circuits 448, 450 and into the reservoir 461 to reduce the static pressure in the first and second hydraulic circuits 448, 450 when the first and second shut-off valves 483, 485 are open. Alternatively, the bi-directional pump of the second pressurizing mechanism 446b can be run in the first working mode to pump fluid out of just the first charge line 494 and therefore the second hydraulic circuit 450 or just the second charge line 495 and therefore the first hydraulic circuit 448 and into the reservoir 461 to reduce the static pressure in just one of the first and second hydraulic circuits 448, 450 by opening just one of the first and second shut-off valves 483, 485. Similarly, the bi-directional pump of the second pressurizing mechanism 446b can be run in the second working mode to pump fluid out of the reservoir 461 and into the charging loop 498 and therefore both of the first and second hydraulic circuits 448, 450 to increase the static pressure in the first and second hydraulic circuits 448, 450 when the first and second shut-off valves 483, 485 are open. Alternatively, the bi-directional pump of the second pressurizing mechanism 446b can be run in the second working mode to pump fluid out of the reservoir 461 and into just the first charge line 493 and therefore the second hydraulic circuit 450 or just the second charge line 495 and therefore the first hydraulic circuit 448 to increase the static pressure in just one of the first and second hydraulic circuits 448, 450 by opening just one of the first and second shut-off valves 483, 485.

Figure 7:
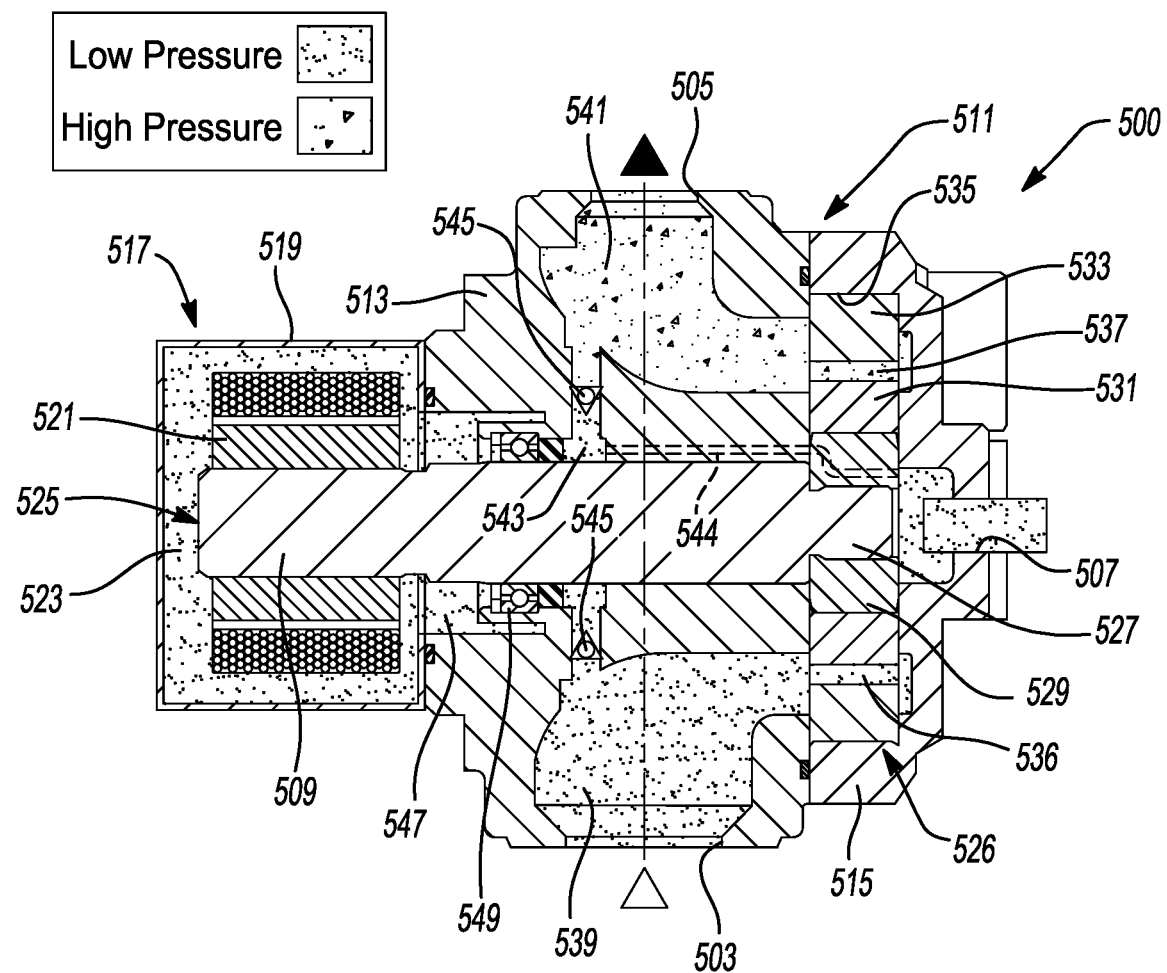
FIG. 7 is a side cross-sectional view of an exemplary bi-directional pump that may be utilized as the first pressurizing mechanism in the exemplary single axle suspension systems shown in FIGS. 4 and 5.
Figure 8:
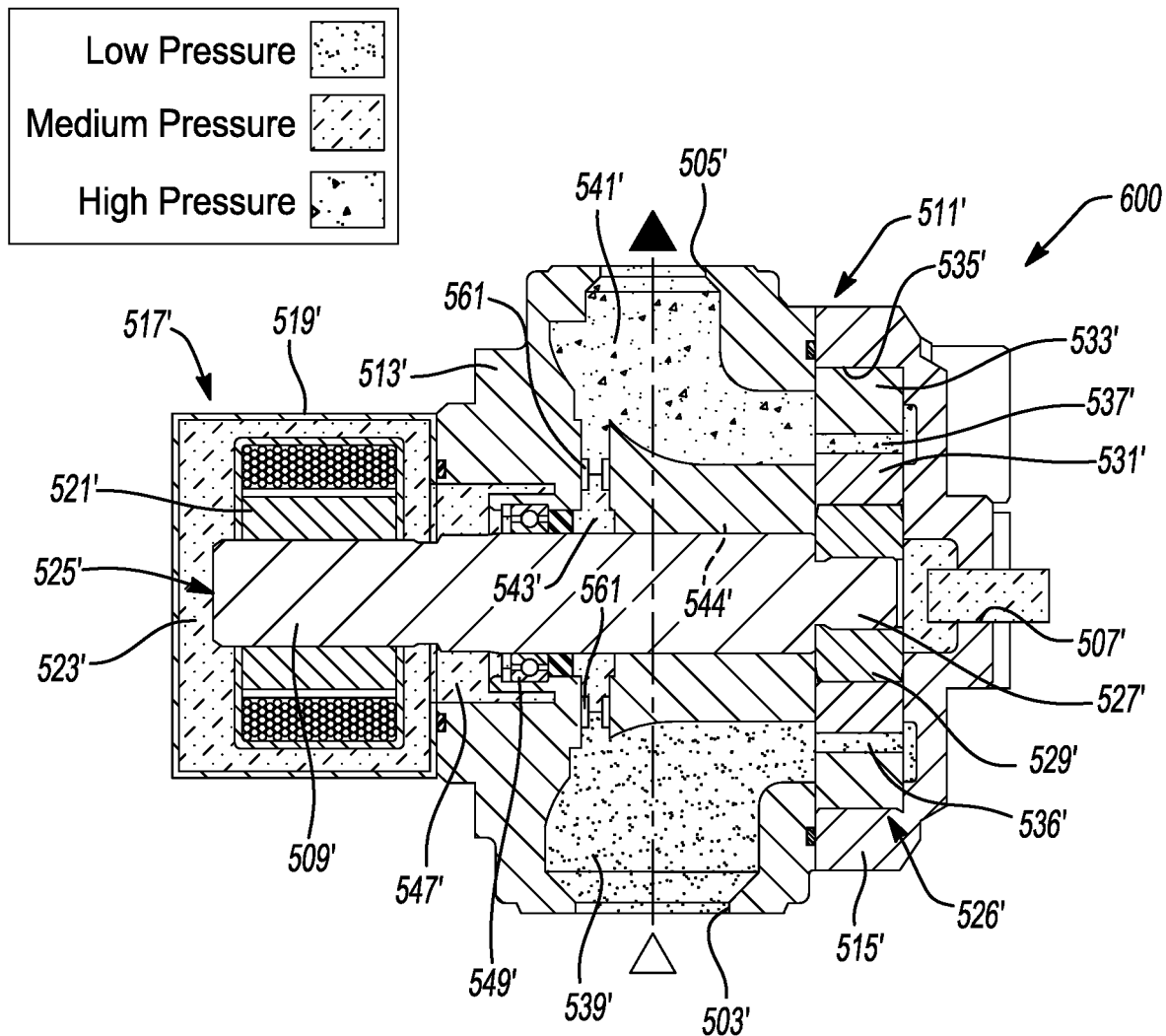
FIG. 8 is a side cross-sectional view of another exemplary bi-directional pump that may be utilized as the first pressurizing mechanism in the exemplary single axle suspension systems shown in FIGS. 4 and 5.

The bi-directional pump of the first pressurizing mechanisms 346a, 346a' shown in FIGS. 4 and 5 may be constructed as a modified gerotor pump 500 as depicted in FIGS. 7 and 8. It should be appreciated that the bi-directional pump 500 need not be constructed as a gerotor, but may be arranged in any other number of geometrical configurations, including a vane pump, an impeller, a radial piston pump or any other suitable mechanical arrangement. Pump 500 may be a fixed displacement or variable displacement pump.

Regardless of the geometrical configuration of the pump, pump 500 includes a first port 503, a second port 505, and a third port 507. As pump 500 is a bidirectional pump, first port 503 will act as an inlet and second port 505 will act as outlet when a direction of rotation of an input shaft 509 is in a first direction of rotation. When input shaft 509 is rotated in a second direction of rotation opposite the first direction of rotation, second port 505 functions as an inlet while first port 503 functions as an outlet. Regardless of the direction of rotation of input shaft 509, third port 507 connects a low or intermediate pressure internal cavity of the pump 500 in series with one of the second pressurizing mechanism 346b, 346b' shown in FIGS. 4 and 5.

In the exemplary embodiment depicted in FIG. 7, the modified gerotor pump 500 includes a housing assembly 511 with a body 513 that is fixed to a cap 515. An electric motor assembly 517 is fixed to body 513. Electric motor assembly 517 includes a motor housing 519 defining a motor cavity 523. An electric motor 521 is positioned within the motor cavity 523. Electric motor 521 is drivingly engaged with a first end 525 of input shaft 509 that is positioned within motor cavity 523. Electric motor 521 may be bi-directionally controlled to rotate input shaft 509 either of the first and second rotational directions.

A gerotor gear assembly 526 is disposed with in a pocket 535 of cap 515. A second end 527 of input shaft 509 is fixed for rotation and arranged in driving engagement with a driven member 529. Driven member 529 is fixed for rotation with an inner rotor 531 of gerotor gear assembly 526. An outer rotor 533 of gerotor gear assembly 526 is guided for rotation within pocket 535. Inner rotor 531 rotates about an axis of rotation that is offset from an axis of rotation of outer rotor 533. Spaces between inner rotor 531 and outer rotor 533 define fluid pumping chambers 536, 537. In the instance depicted in FIG. 7, first port 503 is the suction port or inlet while second port 505 is the high-pressure port or outlet. Fluid positioned within pumping chamber 536 is in fluid communication with a first cavity 539 and first port 503. The fluid at these locations within pump 500 is at a relatively low pressure. As the inner rotor 531 and outer rotor 533 rotate relative to one another, the size of the chambers in which the fluid is transported decreases to increase the pressure therein. Accordingly pumping chamber 537 contains fluid at a relatively high pressure that is provided to a second cavity 541 within body 513. Fluid within second cavity 541 at the increased pressure is supplied to outlet or second port 505.

Third port 507 is arranged in fluid communication with one of the second pressurizing mechanism 346b, 346b' shown in FIGS. 4 and 5. Third port 507 is also arranged in fluid communication with a third cavity 543 via a channel 544 schematically depicted in FIG. 7. It is contemplated that channel 544 extends through cap 515 and body 513 at a position adjacent input shaft 509. Fluid within third cavity 543 is separated from fluid within first cavity 539 and second cavity 541 by check valves 545. The check valves 545 are positioned and oriented such that fluid from third cavity 543 is only allowed to enter a cavity containing fluid at a lower pressure. In the present instance, noting the direction of rotation of input 509, fluid may flow from third cavity 543 to first cavity 539 containing low pressure fluid, but not toward second cavity 541.

Third port 507 and third cavity 543 are in fluid communication with a bearing cavity 547 and motor cavity 523. Heat transfer and lubrication functions may be performed by the fluid within these cavities during operation of pump 500. Input shaft 509 is rotatably supported by a bearing 549.

FIG. 8 depicts another alternative embodiment of a modified gerotor pump identified at reference numeral 600. Pump 600 is a bidirectional gerotor pump substantially similar to pump 500. Accordingly, like elements will retain their previously identified reference numerals with a prime suffix. For the sake of brevity, pump 600 will be described in view of the differences between pump 600 and pump 500.

Pump 600 includes restricted passages or orifices 561 in lieu of check valves 545 shown in FIG. 7. As the orifices 561 are always at least partially open, the pressure of the fluid within third cavity 543', motor cavity 523', bearing cavity 547', and channel 544' is of a magnitude between the fluid pressure within second cavity 541' and first cavity 539'. It should be appreciated that restricted passages 561 provide relatively low cross-sectional flow areas in order to maintain three distinct zones of fluid pressure as depicted in FIG. 8.

Many other modifications and variations of the present disclosure are possible in light of the above teachings and may be practiced otherwise than as specifically described while within the scope of the appended claims.

What is claimed is:

1. A single axle suspension system, comprising:
right and left dampers each including a damper housing, a piston rod, and a piston that is mounted on the piston rod and arranged in sliding engagement inside the damper housing such that the piston divides the damper housing into first and second working chambers;
a first hydraulic circuit connecting the first working chamber of the right damper and the second working chamber of the left damper;
a second hydraulic circuit connecting the second working chamber of the right damper and the first working chamber of the left damper;
a first pressurizing mechanism that is connected in fluid communication with the first and second hydraulic circuits and configured to adjust roll resistance of the single axle suspension system by generating a pressure differential between the first and second hydraulic circuits independent of damper movements; and
a second pressurizing mechanism that is connected in series with the first pressurizing mechanism and configured to adjust static pressure within the first and second hydraulic circuits by adding and removing hydraulic fluid to and from the first and second hydraulic circuits.

2. The single axle suspension system set forth in claim 1, wherein the first pressurizing mechanism is a bi-directional pump.

3. The single axle suspension system set forth in claim 2, wherein the first pressurizing mechanism has a first bi-directional conduit that is connected in fluid communication with the first hydraulic circuit and a second bi-directional conduit that is connected in fluid communication with the second hydraulic circuit.

4. The single axle suspension system set forth in claim 3, wherein the bi-directional pump of the first pressurizing mechanism has a first working mode where the first bi-directional conduit acts as a pump outlet and the second bi-directional conduit acts as a pump inlet and wherein the bi-directional pump of the first pressurizing mechanism has a second working mode where the first bi-directional conduit acts as the pump inlet and the second bi-directional conduit acts as the pump outlet.

5. The single axle suspension system set forth in claim 4, further comprising:
first and second charge lines that extend between and interconnect the first and second bi-directional conduits of the first pressurizing mechanism with the first and second hydraulic circuits.

6. The single axle suspension system set forth in claim 4, further comprising:
at least one shut-off valve positioned between the first and second pressurizing mechanisms, wherein the pressure differential between the first and second hydraulic circuits is enabled when the at least one shut-off valve is closed to provide roll resistance and wherein the pressure differential between the first and second hydraulic circuits will equalize when the at least one shut-off valves is open.

7. The single axle suspension system set forth in claim 2, wherein the second pressurizing mechanism has a variable volume chamber with a driven piston that is moveable in first and second directions to increase and decrease the volume of the variable volume chamber.

8. The single axle suspension system set forth in claim 7, wherein movement of the driven piston of the second pressurizing mechanism in the first direction decreases the volume in the variable volume chamber of the second pressurizing mechanism and pushes the hydraulic fluid out of the variable volume chamber of the second pressurizing mechanism and into at least one of the first and second hydraulic circuits to cause an increase in the static pressure and wherein movement of the driven piston of the second pressurizing mechanism in the second direction increases the volume in the variable volume chamber of the second pressurizing mechanism and draws the hydraulic fluid into the variable volume chamber of the second pressurizing mechanism from at least one of the first and second hydraulic circuits to cause a decrease in the static pressure.

9. The single axle suspension system set forth in claim 8, wherein the second pressurizing mechanism includes a ball/screw mechanism that is configured to operably drive movement of the driven piston in the first and second directions.

10. The single axle suspension system set forth in claim 2, wherein the second pressurizing mechanism is a bi-directional pump.

11. The single axle suspension system set forth in claim 1, wherein the first pressurizing mechanism is a dual impeller bi-directional pump.

12. The single axle suspension system set forth in claim 1, wherein the first hydraulic circuit includes a first pair of variable flow control valves that are configured to regulate fluid flow between the first hydraulic circuit and the first working chamber of the right damper and between the first hydraulic circuit and the second working chamber of the left damper and wherein the second hydraulic circuit includes a second pair of variable flow control valves that are configured to regulate fluid flow between the second hydraulic circuit and the first working chamber of the left damper and between the second hydraulic circuit and the second working chamber of the right damper.

13. A single axle suspension system, comprising:
right and left dampers each including a damper housing, a piston rod, and a piston that is mounted on the piston rod and arranged in sliding engagement inside the damper housing such that the piston divides the damper housing into first and second working chambers;
a first hydraulic line extending between and connecting the first working chamber of the right damper and the second working chamber of the left damper;
a second hydraulic line extending between and connecting the second working chamber of the right damper and the first working chamber of the left damper;
a first pressurizing mechanism in the form of a bi-directional pump that is connected in fluid communication with the first and second hydraulic lines and configured to adjust roll resistance of the single axle suspension system by generating a pressure differential between the first and second hydraulic lines independent of damper movements; and
a second pressurizing mechanism that is connected in series with the first pressurizing mechanism and configured to adjust static pressure within the first and second hydraulic lines by adding and removing hydraulic fluid to and from the first and second hydraulic lines.

14. The single axle suspension system set forth in claim 13, wherein the second pressurizing mechanism is a bi-directional pump that is connected to and configured to pump the hydraulic fluid between third and fourth hydraulic lines.

15. The single axle suspension system set forth in claim 14, further comprising:
a reservoir that is connected in fluid communication with the bi-directional pump of the second pressurizing mechanism by the third hydraulic line; and
first and second charge lines that extend between and interconnect the first and second hydraulic lines with the fourth hydraulic line, wherein the bi-directional pump of the first pressurizing mechanism is connected to and configured to pump the hydraulic fluid between the first and second charge lines to generate the pressure differential between the first and second hydraulic lines.

16. The single axle suspension system set forth in claim 15, wherein the bi-directional pump of the first pressurizing mechanism includes a first impeller that is arranged in fluid communication with the first charge line and a second impeller that is arranged in fluid communication with the second charge line.

17. The single axle suspension system set forth in claim 16, wherein a bridge line extends between and interconnects the first and second impellers such that the first and second charge lines and the bridge line collectively form a charge loop that includes junctions with the first, second, and fourth hydraulic lines.

18. The single axle suspension system set forth in claim 15, further comprising:
a first shut-off valve that is positioned in the first charge line; and
a second shut-off valve that is positioned in the second charge line,
wherein the pressure differential between the first and second hydraulic circuits is enabled when the first and second shut-off valves are closed to provide roll resistance and wherein the pressure differential between the first and second hydraulic circuits will equalize when the first and second shut-off valves are open.

19. The single axle suspension system set forth in claim 13, wherein the second pressurizing mechanism has a variable volume chamber and a ball/screw mechanism that is configured to operably drive movement of a driven piston in opposing directions to increase and decrease the volume of the variable volume chamber.

20. A single axle suspension system, comprising:
right and left dampers each including a damper housing, a piston rod, and a piston that is mounted on the piston rod and arranged in sliding engagement inside the damper housing such that the piston divides the damper housing into first and second working chambers;
a first hydraulic circuit connecting the first working chamber of the right damper and the second working chamber of the left damper;
a second hydraulic circuit connecting the second working chamber of the right damper and the first working chamber of the left damper;
a first pressurizing mechanism that is connected in fluid communication with the first and second hydraulic circuits;
a second pressurizing mechanism that is connected to the first pressurizing mechanism via at least one hydraulic line; and
at least one shut-off valve positioned in the at least one hydraulic line extending between the first and second pressurizing mechanisms, wherein the first pressurizing mechanism configured to adjust roll resistance of the single axle suspension system by generating a pressure differential between the first and second hydraulic circuits independent of damper movements when the at least one shut-off valve is closed and the second pressurizing mechanism is configured to adjust static pressure within the first and second hydraulic circuits by adding and removing hydraulic fluid to and from the at least one hydraulic line extending between the first and second pressurizing mechanisms when the at least one shut-off valves is open.

* * * * *